United States Patent
Ohta et al.

[11] Patent Number: 6,044,254
[45] Date of Patent: Mar. 28, 2000

[54] RECEIVING CIRCUIT

[75] Inventors: Gen-ichiro Ohta, Ebina; Kazunori Inogai, Yokohama; Fujio Sasaki, Yokohama; Hiroaki Sudo, Yokohama, all of Japan

[73] Assignee: Matsushita Electric Industrial Co., Ltd., Osaka, Japan

[21] Appl. No.: 08/999,068

[22] Filed: Dec. 29, 1997

[30] Foreign Application Priority Data

Dec. 27, 1996 [JP] Japan .................................... 8-356748

[51] Int. Cl.[7] ............................................. H04B 7/08
[52] U.S. Cl. ........................ 455/272; 455/273; 455/275
[58] Field of Search ................................. 455/272, 339, 455/263, 286, 242.1, 242.2, 275, 273

[56] References Cited

U.S. PATENT DOCUMENTS

| | | | |
|---|---|---|---|
| 5,248,984 | 9/1993 | Sezai | 342/427 |
| 5,321,850 | 6/1994 | Backstrom et al. | 455/139 |
| 5,475,875 | 12/1995 | Katsuyama et al. | 455/275 |
| 5,517,686 | 5/1996 | Kennedy et al. | 455/273 |
| 5,553,102 | 9/1996 | Jasper et al. | 375/347 |
| 5,602,835 | 2/1997 | Seki et al. | 370/206 |
| 5,613,219 | 3/1997 | Vogel et al. | 455/272 |
| 5,703,527 | 12/1997 | Iwasaki | 329/336 |

*Primary Examiner*—Edward F. Urban
*Assistant Examiner*—Thuan T. Nguyen
*Attorney, Agent, or Firm*—Pearne, Gordon, McCoy & Granger LLP

[57] ABSTRACT

A receiving circuit includes a first antenna 1, a second antenna 2, units 10 and 11 for generating a sum signal or a difference signal from signals of two paths received by the respective antennas, a unit 12 for giving delay to either an output of the sum signal generating unit or an output of the difference signal generating unit, a unit 13 for summationally combining an output of the delay unit and the signal of the not-delayed path, a desired-wave pass filter unit 14 for receiving an output of the summationally combining unit, a dividing unit 15 for receiving an output of the desired-wave pass filter unit, an orthogonal detection unit 16–19 for receiving an output of the dividing unit, and a filter unit 20 and 21 for receiving an output of the orthogonal detection unit to extract a base band signal therefrom, wherein the receiving path including the summationally combining unit and the following are made into one path to thereby attain miniaturization and low power consumption.

6 Claims, 11 Drawing Sheets

FIG.2A  BEFORE-SPREAD SIGNAL

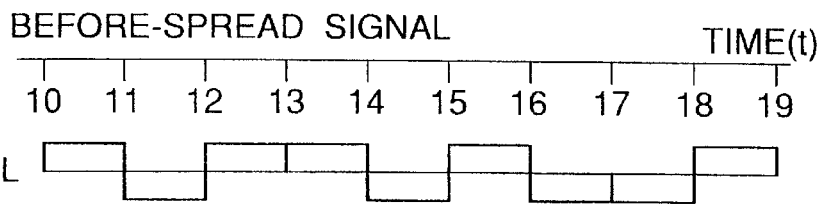

FIG.2B  ANTENNA RECEPTION SIGNAL

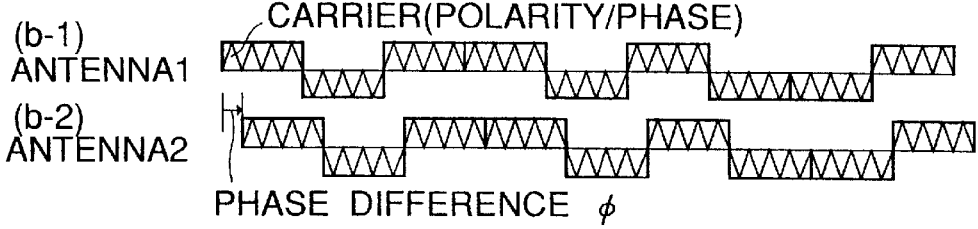

(b-1) ANTENNA1 — CARRIER(POLARITY/PHASE)
(b-2) ANTENNA2
PHASE DIFFERENCE $\phi$

FIG.2C  SIMPLE SUMMATION

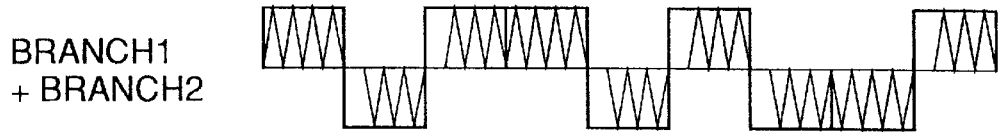

BRANCH1 + BRANCH2

FIG.2D  SIMPLE SUBTRACTION

BRANCH1 − BRANCH2

FIG.2E  THE RESULT OF SIMPLE SUBTRACTION IS DELAYED BY ONE CHIP-TIME

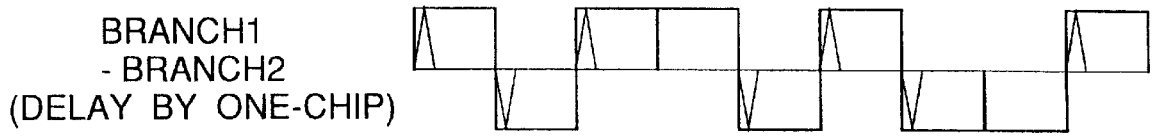

BRANCH1 − BRANCH2 (DELAY BY ONE-CHIP)

FIG.2F  CANCELING AVOIDING EFFECT IN THE CASE OF SUM-DIFFERENCE DELAY COMBINATION

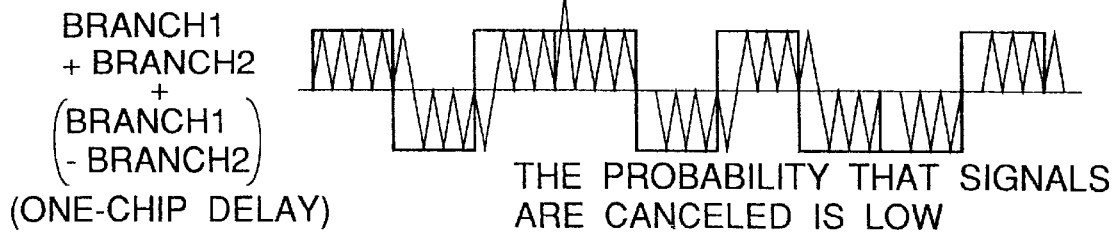

BRANCH1 + BRANCH2 + (BRANCH1 − BRANCH2) (ONE-CHIP DELAY)

THE PROBABILITY THAT SIGNALS ARE CANCELED IS LOW

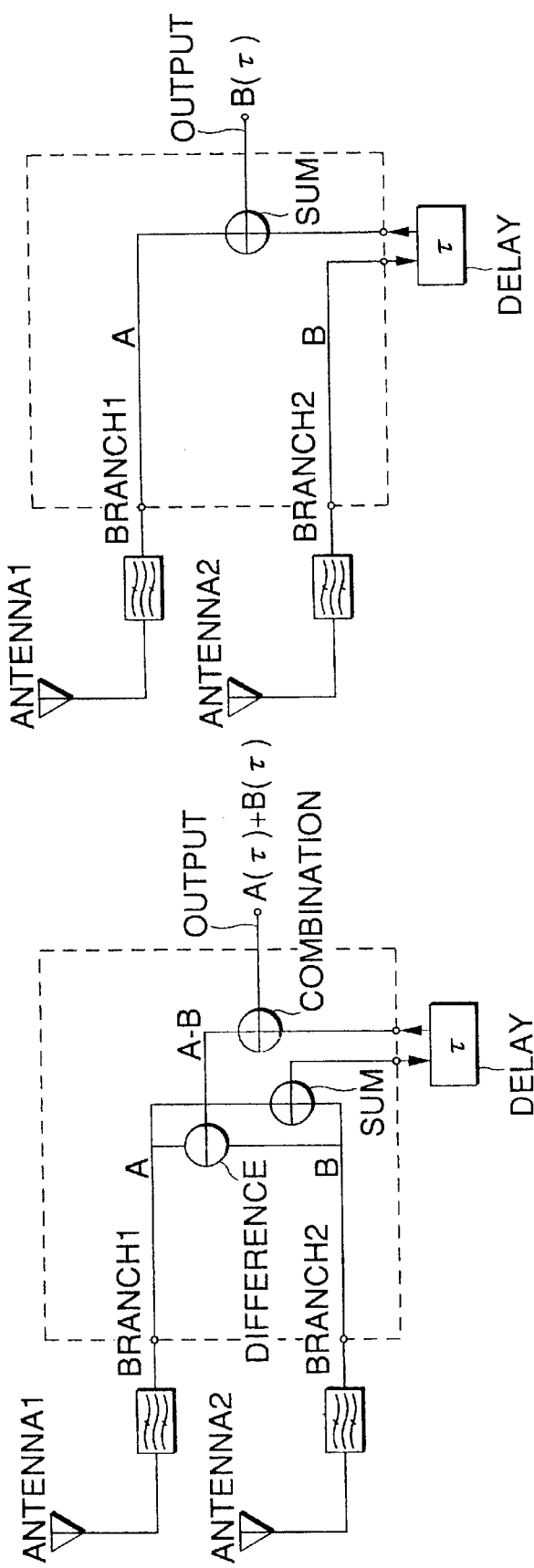

BEFORE-SPREAD SIGNAL

CHIP SIGNAL

ANTENNA RECEPTION SIGNAL — CARRIER(POLARITY/PHASE)
(b-1) ANTENNA1
(b-2) ANTENNA2
PHASE DIFFERENCE $\phi$

CANCELING IN THE CASE OF SIMPLE SUMMATION(SUBTRACTION)

BRANCH1 - BRANCH2

CANCELING IN THE CASE OF SIMPLE DELAY-COMBINATION

BRANCH1
+
(BRANCH2)
(ONE-CHIP DELAY)

RECEIVING CIRCUIT

BACKGROUND OF THE INVENTION

1. Field of the Invention

The present invention relates to a receiving circuit of a communication equipment, and particularly relates to a receiving circuit in which superior stability in received signal strength can be obtained.

2. Description of the Related Art

Conventional receivers of communication equipments almost have a space diversity function using a plurality of antennas in order to reduce the influence of fading.

Conventionally, a receiving circuit in a space diversity path shown in FIG. 9 is known. The configuration and principle of the receiving circuit of a first conventional example will be described below with reference to FIG. 9.

In FIG. 9, an arriving radio wave induces a high-frequency signal in each of antennas 201 and 202. The induced signals pass through reception filters 203 and 204 respectively, and are supplied to first-stage reception amplifiers 205 and 206 so as to be amplified respectively. These outputs are supplied to frequency converters 207 and 208 so as to be subjected to frequency-reducing conversion, converted into intermediate-frequency band signals. These intermediate-frequency band signals are supplied to intermediate-frequency amplifiers 211 and 212 through filters 209 and 210 for eliminating unnecessary signals. The outputs of the amplifier 211 and 212 are supplied to detection circuits 215 and 216 through channel filters 213 and 214 for making only desired-frequency signals pass therethrough. The results of the detection circuits 215 and 216 are compared with each other in a comparison circuit 217, and a stronger signal in received signal strength is selected as an output 218. A diversity function is thus realized. A local frequency oscillator 219 supplies a local oscillation frequency signal to the frequency converters 207 and 208 in common.

That is, the above-mentioned first conventional example is constituted by two paths of receiving circuits which are independent of each other perfectly, and a common local signal circuit designed so as to make signal purity and phase uniform. An output in obtained by selection or combination of the two paths of received signals demodulated by these perfectly independent receiving circuits.

However, in the receiving circuits in the space diversity path in the above-mentioned first conventional example, not only the two independent receiving circuits consume power, but also their constituent parts increase the equipment volume. In addition, it is necessary to make the performance of the two paths of the receiving circuits equal to each other. Therefore, a second conventional example improving the above-mentioned first conventional example as shown in FIG. 10 has been known. FIG. 10 shows a spectrum spread communication diversity receiver disclosed in JP-A-7-87057, as the second conventional example. In FIG. 10, the spectrum spread communication diversity receiver is constituted by antennas 313 and 314, filters 315 and 316, amplifiers 317 and 318, a delay circuit 319, a combination circuit 320, a matched filter correlator 321, a phase detector 322, a delay circuit 323, a combination circuit 324, and a data demodulator 325.

The antenna 313 and the antenna 314 are made apart from each other by a distance of λ/3 or more, so that there is substantially no correlation between an SS received signal S5(t) from the antenna 313 side and an SS received signal S6(t) from the antenna 314 side. The filters 315 and 316 eliminate signals in any band other than the signals S5(t) and S6(t). The amplifiers 317 and 318 amplify the signals S5(t) and S6(t).

The delay circuit 319 delays an output S8(t) of the amplifier 318, while the delay time τ is set to τ≧τa in the condition that τ≧one chip length of PN code, and τa designates the maximum delay time of a reflected wave which is influential on a direct wave. The combination circuit 320 combines an output S7(t) of the amplifier 317 and an output S9(t–τ) of the delay circuit 319. The combined SS received signal is separated in the time domain on the basis of the correlative operation with reference PN code performed in the correlator 321.

The reason why the delay is given by the delay circuit 319 is that the SS signal received on the antenna 313 side and the SS signal received on the antenna 314 side which are combined by the combination circuit 320 are separated in the time domain as correlative spike by the correlator 321 to thereby eliminate the interference between the SS signals of the antenna 313 side and of the antenna 314 side.

Then, in the SS signal received on the antenna 313 side, most of combined correlative spikes are suppressed when the difference in delay time between the direct wave and the reflected wave is within one chip length of PN code and the difference in phase between carriers in the correlative spikes outputted from the correlator for the respective received signals is 180° (reverse phase). However, because the SS signal received on the antenna 314 side is not correlative with that of the antenna 313 side, a received signal with independent parameters are obtained. For example, if the above-mentioned difference in phase between carriers in the correlative spikes is 0° (in-phase), the combined correlative spikes are hardly suppressed.

In such a state, if combination is performed under the condition of giving delay (by 4 chip length of PN code herein) to the SS signal received on the antenna 314 side, the correlative spikes are prevented frog being suppressed by multi-path, so that it is possible to improve the S/N ratio of the received SS signals, and it is possible to improve the performance of data demodulation.

In addition, in this conventional example, the correlative output of the correlator 321 is delayed and detected by the phase detector 322 in order to more improve the performance of data demodulation. Then, in the phase detector 322, detection is performed after multiplying a signal passing through the delay circuit with a delay of one data bit T with an original signal, and the multiplied signal is made to pass through a low pass filter so as to obtain an output.

This delay detection output divides the correlative output of a base band into two divisions. One of the two divisions is delayed in the delay circuit 323, and combined with the other in the combination circuit 324 again. Then, all the delay circuits are set to have an equal delay time. The output of the combination circuit 324 is supplied to the data demodulator 325. With this configuration, two SS signals S10(t) and S11(t–τ) received on the antennas 313 side and on the antenna 314 side respectively are suppressed by multi-path, and made into a signal S12 (t) by the combination of their correlative peaks, so that its correlative peak value in $V_1+V_2$ when the peak values of the respective signals are $V_1$ and $V_2$ respectively. The S/N ratio is more improved, so that it is possible to improve the performance of data demodulation.

According to the above-mentioned second conventional example, the two paths of received signals are made into a single path in the combination circuit 320 and the following means, so that there is an effect to reduce the number of parts of the receiving circuits.

However, in the above-mentioned second conventional example, the canceling operation of carriers themselves between the two paths of received signals in left as it is, so that the output of the combination circuit 320, that is, the input signal of the matched-filter correlator 321 is attenuated with a high probability.

The aspect of this attenuation will be explained with reference to FIGS. 11A to 11D. FIGS. 11A to 11D show an example of a diversity effect in the second conventional example shown in FIG. 10. FIG. 11A designates a signal referred to as a so-called chip which is a product of a spread signal and an information signal of a spectrum spread communication signal sent to this receivers. FIG. 11B designates signals received by receiver antennas in the case of a modulation output in which a chip signal is modulated into 4 times of carrier frequency as a modulation wave by way of example. A portion (b-1) of FIG. 11B designates a signal received by an antenna 1, while a portion (b-2) of FIG. 11B a signal received by an antenna 2. Because the antenna 1 and the antenna 2 are made to be separated from each other by a distance of ⅓ or more of the wave length of a carrier in the second conventional example, the distance is net to one wave length herein, and the difference in phase φ is made 2π. FIG. 11C designates the case where a signal path received from the antenna 1, that in, a signal of a branch 1, and a signal path received from the antenna 2, that is, a signal of a branch 2 are added to each other by a differential amplifier, that is, subtracted from each other. FIG. 11D designates the case where the signal of the branch 1 side is simply combined with the delayed signal of the branch 2 side in accordance with the second conventional example.

In FIGS. 11A to 11D, in order to make the explanation of the problem clear, it is assumed that there arises no canceling operation between arriving waves caused by multi-path fading in the antenna 1 and the antenna 2. It is understood from FIG. 11C that when the signals of the branches are added or subtracted simply, an adding/canceling operation of the signals similar to the canceling operation caused by multi-path fading arising on the antenna ends arises between the branches, so that there is a high probability that the time when the received signals disappear occurs frequently. In addition, it in understood from FIG. 11D that although there is some effect obtained by delaying a signal, the time of signal disappearance remains as it is with considerable frequency.

On the contrary, in the first conventional example, the signal superior in received conditions in selected from the branch 1 and the branch 2 every moment, or adaptive combination of signals is performed so as to eliminate the time when the received signals disappear. Therefore, it is impossible in the second conventional example to obtain a space diversity effect equal to that in the first conventional example.

SUMMARY OF THE INVENTION

The present invention has been made to solve the foregoing conventional problems, and it is an object of the present invention to provide a receiving circuit in which superior stability in received signal strength can be obtained.

In order to solve the above problem, according to the present invention, there is provided a receiving circuit comprising means for generating a sum signal or a difference signal from signals of two paths received by the respective antennas, means for giving delay to either an output of the sum signal generating means or an output of the difference signal generating means, means for summationally combining an output of the delay means and the signal of the not-delayed path, a desired-wave pass filter means for receiving an output of the summationally combining means, a dividing means for receiving an output of the desired-wave pass filter means, an orthogonal detection means for receiving an output of the dividing means, and a filter means for receiving an output of the orthogonal detection means to extract a base band signal therefrom, wherein the receiving path including the summationally combining means and the following are made into one path.

With this configuration, not only a space diversity function similar to that of the first conventional example having two receiving paths independently can be realized, but also the size and the power consumption can be reduced.

According to a first aspect of the invention, there is provided a receiving circuit comprising a first antenna, a second antenna, means for generating a sum signal or a difference signal from signals of two paths received by the respective antennas, means for giving delay to either an output of the sum signal generating means or an output of the difference signal generating means, means for summationally combining an output of the delay means and the signal of the not-delayed path, a desired-wave pass filter means for receiving an output of the summationally combining means, a dividing means for receiving an output of the desired-wave pass filter means, an orthogonal detection means for receiving an output of the dividing means, and a filter means for receiving an output of the orthogonal detection means to extract a base band signal therefrom, wherein the receiving path including the summationally combining means and the following are made into one path. Accordingly, there is obtained an effect that the size and the power consumption can be reduced.

According to a second aspect of the invention, there is provided a receiving circuit according to the first aspect of the invention, wherein means for subtractively combining the output of the delay means and the signal of the not-delayed path is provided in place of the means for summationally combining the output of the delay means and the signal of the not-delayed path. Accordingly, there is obtained an effect that noise from a power supply path or distortion in the same kind in the reception input circuit can be reduced.

According to a third aspect of the invention, there in provided a receiving circuit according to the first aspect of the invention, further comprising an intermediate-frequency converting means constituted by an intermediate-frequency local oscillation signal source, a frequency conversion mixer and an intermediate-frequency band filter is provided, wherein the output of the means for summationally combining the output of the delay means and the signal of the not-delayed path or the output of the means for subtractively combining the output of the delay means and the signal of the not-delayed path is applied to the intermediate-frequency converting means to thereby make the receiving path including the intermediate-frequency band stage and the following into one path. Accordingly, there in obtained an effect that the influence of phase error produced In the generation of the sum signal or the difference signal can be reduced.

According to a fourth aspect of the invention, there is provided a receiving circuit according to the first aspect of the invention, wherein individual frequency converting means are provided for the signals of the two paths obtained from the respective antennas, and the means for generating a sum signal and a difference signal from the signals of the two paths obtained by the respective frequency converting means are provided in an intermediate-frequency band to make the receiving path including the intermediate-frequency band stage and the following into one path. Accordingly, there is obtained an effect that not only the phase accuracy based on the circuit wiring length can be prescribed by the intermediate-frequency band, but also power consumption can be reduced.

According to a fifth aspect of the invention, there is provided a receiving circuit according to the first aspect of the invention, wherein three or more antennas are provided to constitute three or more branches, and that means for generating a sum signal and a difference signal upon signals from the three or more paths, so that means for giving delay to all but one of outputs of the sum signal generating means or outputs of the difference signal generating means, means for summationally or subtractively combining an output of the delay means and the signal of the not-delayed path are provided to thereby make the receiving path including the combination means and the following into one path. Accordingly, there is an effect that the size and the power consumption can be reduced.

BRIEF DESCRIPTION OF THE DRAWINGS

FIGS. 2A to 2F are diagrams for explaining the operation in the first embodiment of the present invention;

FIGS. 3A and 3B are diagrams for respectively explaining the effect in the first embodiment of the present invention and in a second conventional receiving circuit;

DETAILED DESCRIPTION OF THE PREFERRED EMBODIMENTS

A description will be given in more detail of preferred embodiments of the invention with reference to FIGS. 1 to 8.

First Embodiment

Figure 1:
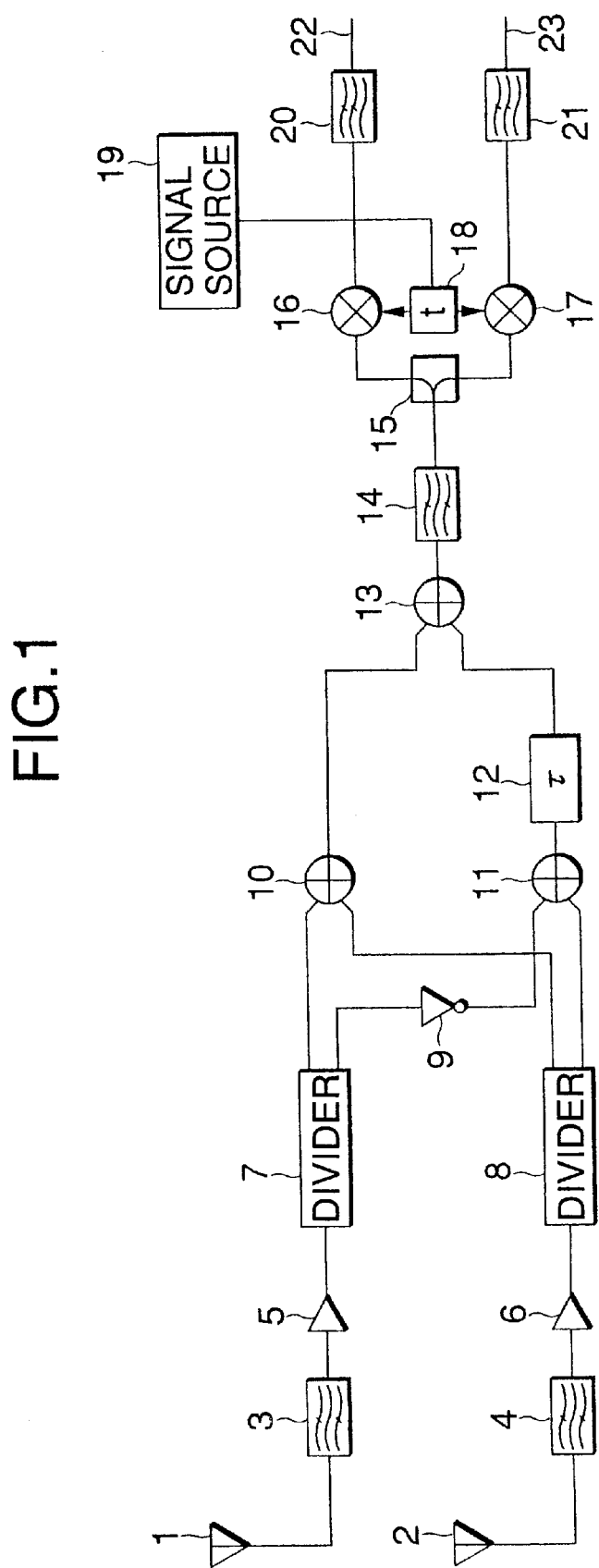
FIG. 1 is a diagram illustrating the configuration of a receiving circuit according to a first embodiment of the present invention.

FIG. 1 shows a configuration of a receiving circuit in a first embodiment of the present invention. In FIG. 1, the receiving circuit is constituted by an antenna 1 for a branch 1 of space diversity, an antenna 2 for a branch 2 of space diversity, a filter 3 for receiving an arriving wave signal obtained by the antenna 1 and extracting a signal component in a desired band, a filter 4 for receiving an arriving wave signal obtained by the antenna 2 and extracting a signal component in a desired band, an amplifier 5 for amplifying the desired-band signal obtained by the filter 3, an amplifier 6 for amplifying the desired-band signal obtained by the filter 4, means 7 for dividing the desired-band signal of the branch 1 side into two paths, means 8 for dividing the desired-band signal of the branch 2 side into two paths, means 9 for inverting a polarity or shifting a phase by 180 degrees, means 10 for combining a signal from the dividing means 7 and a signal from the dividing means 8, means 11 for combining a signal from the polarity inverting or 180-degrees phase shifting means 9 and a signal from the dividing means 8, means 12 for receiving and delaying the output of the combining means 11, means 13 for receiving the output of the combining means 10 and the output of the delay means 12 and combining the received outputs, a filter means 14 for receiving the output of the combining means 13 and limiting the received output in a desired signal band, means 15 for receiving the output of the filter means 14 and dividing the received output, a first multiplier 16 constituting an orthogonal detector, a second multiplier 17 constituting the orthogonal detector, a distributor 18 including a $\pi/2$ phase shifter so as to give a phase shift to one of the orthogonal detectors and feed a detection local oscillation signal to the orthogonal detector, a signal source 19 of the local oscillation signal fed to the distributor 18, a filter 20 for receiving the output of the first multiplier 16 and extracting a base band signal, a filter 21 for receiving the output of the second multiplier 17 and extracting a base band signal, an output terminal 22 from which the output of the first base band signal obtained by orthogonal detection it obtained, and an output terminal 23 from which the output of the second base band signal obtained by orthogonal detection in obtained.

The operation of the above configuration will be described with reference to FIGS. 2A to 2F. FIGS. 2A and 2B are similar to FIGS. 11A to 11D. FIG. 2A designates a signal referred to as so-called chip which is a product of a spread signal and an information signal of a spectrum spread communication signal transmitted to this receiver. FIG. 2B designates a signal received by the receiver antennas in the case of a modulation output obtained by using the chip signal as a modulated wave and modulating the chip signal to a four-times carrier frequency by way of example.

A portion (b–1) of FIG. 2B designates a signal received by the antenna 1, and a portion (b–2) of FIG. 2B designates a signal received by the antenna 2. The antenna 1 and the antenna 2 are set to 1 wave length in view of the carrier, and the phase difference φ between the antenna 1 and the antenna 2 is made 2π. FIG. 2C designates the case where subtraction is made between the reception path received by the antenna 1, that is, the signal of the branch 1, and the reception-path received by the antenna 2, that is, the signal of the branch 2. FIG. 2D designates the case where the signal of the branch 2 side is delayed in accordance with the above-mentioned second conventional example so as to combine this signal and the signal of the branch 1 side by simple addition. FIG. 2C designates the case where simple addition in made between the reception path received by the antenna 1, that is, the signal of the branch 1, and the reception path received by the antenna 2, that is, the signal of the branch 2. FIG. 2D designates the case where simple subtraction is made. FIG.

Figure 11A:
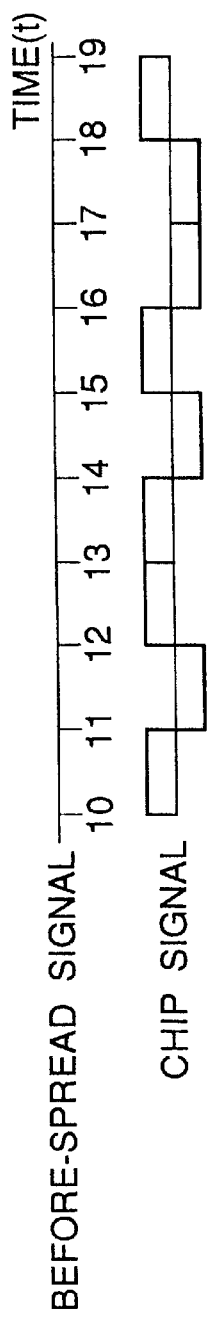
FIGS. 11A to 11D are diagrams for explaining the operation of the second conventional receiving circuit.
Figure 11B:
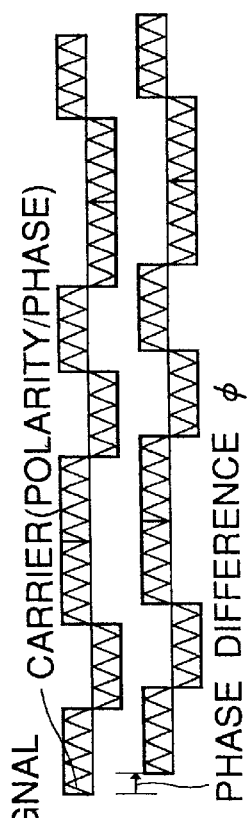
Figure 11C:
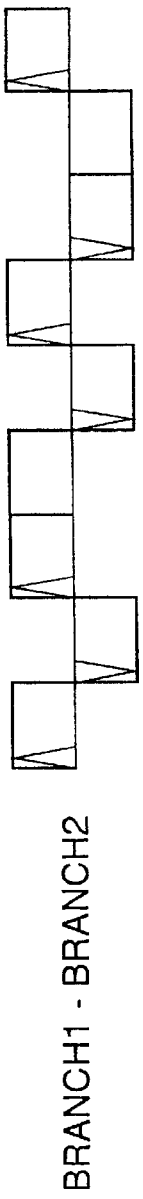
Figure 11D:
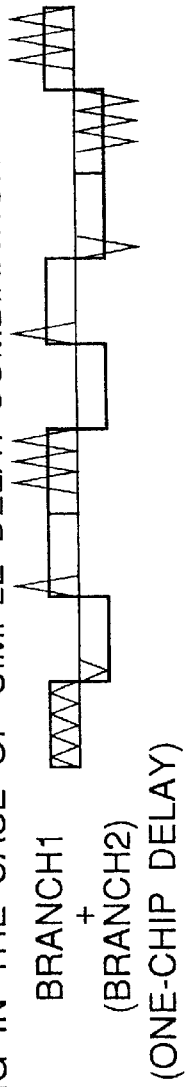

2D corresponds to FIG. 11C. FIG. 2E shows that the result of the simple subtraction in FIG. 2D is delayed by one chip time. FIG. 2F shows that FIGS. 2C and 2E are combined summationally.

Also in FIGS. 2A to 2F, in order to make the description clear, it is assumed that there arises no canceling operation between arriving waves caused by multi-path fading in the antenna 1 and the antenna 2.

It is understood from FIG. 2F that the canceling operation between signals of the branches is reduced, so that the time when the signals disappear can be reduced extremely. This will be explained by numerical expressions. Respective parameters in the numerical expressions are shown in FIGS. 3A and 3B.

FIG. 3A shows parameters in the first embodiment of the present invention, and FIG. 3B shows parameters in the above-mentioned second conventional example.

Refer to the path in the first embodiment of the present invention as sum-difference delay combination, and refer to the path in the above-mentioned second conventional example as simple delay combination.

When the not-delayed and delayed signals of the branch 1 are represented by A and $A(\tau)$ respectively, and the not-delayed and delayed signals of the branch 2 are represented by B and $B(\tau)$ respectively, outputs in the respective combinations can be expressed by:

(sum-difference delay combination)=$A-B+\{A(\tau)+B(\tau)\}$ (simple delay combination)=$A+B(\tau)$.

First, the conditions when the output of the simple delay combination which is the second conventional example becomes zero will be examined.

It is apparent that the output becomes zero if the amplitudes of the branch 1 and the branch 2 are equal, and the phase difference between the two branches is 180 degrees at the time of generating a sum signal. That is, the signal disappears at the output terminal when established is:

$|A|=|B(\tau)|=(|B|)$ angle($A$)−angle($B(\tau)$)=$(2n+1)\pi$.

The phase difference $(2n+1)\pi$ between A and $B(\tau)$ is the sum of the delay time $\tau$ and the phase difference between the two branches. Therefore, the phase between the branches changes variously under the practical environment, so that the moment satisfying this condition appears in a high frequency.

Although it can be considered that this condition is prevented from being established by controlling the delay time of the delay circuit adaptively, it is almost impossible to do so under the moving situations of mobile communication. When the addition of equipments required for such control and the increase of power consumption are taken into consideration, such control can be judged not practical.

Next, it will be confirmed whether the signal disappears in the path of the present invention or not when the above condition is established.

The sum-difference delay combination will be considered on the same divisional components an the component in the second conventional example, that is, the portion of $A+B(\tau)$, and the unique component, that is, the portions of $A(\tau)-B$. Under this condition, the same component as that in the second conventional example:

$A+B(\tau) \to 0,$ but the unique component of the present invention:

$A(\tau)-B \to 2A$ or $2B(\neq 0)$.

Therefore, totally, (sum-difference delay combination)=$2A(\neq 0)$.

It is therefore understood that an output signal can be ensured without disappearing in the present invention even under the condition in which the signal disappears in the second conventional example.

Next, it will be considered whether the output disappears or not under peculiar conditions in the path of the present invention.

That in the case where the sum-difference delay combination becomes zero can be expressed by:

(sum-difference delay combination)=$A-B+A(\tau)+B(\tau)$).

When the carrier frequency in represented by $\omega_0$, the above expression can be expressed by the following expression (1).

$$A-B+A(\tau)+B(\tau)=A_0\{\cos \omega_0(t)+\cos \omega_0(t+\tau)\}+B_0\{-\cos \omega_0(t)+\cos \omega_0(t+\tau)\} \quad (1)$$

wherein $A_0 \geq 0$, $B_0 \geq 0$.

In order to make the value of this expression take zero, the first term and the second term must cancel each other, or both the first and second terms must take zero at the same time, so long as $A_0$ and $B_0$ are not zero.

First, in order to confirm whether the first term and the second tern cancel each other or not, the following expression (2) is obtained by combining like terms.

$$A_0\{\cos \omega_0(t)+\cos \omega_0(t+\tau)\}+B_0\{-\cos \omega_0(t)+\cos \omega_0(t+\tau)\}$$
$$=(A_0-B_0)\cos \omega_0(t)+(A_0+B_0)\cos \omega_0(t+\tau) \quad (2)$$

In order to make the value of this expression (2) take zero in the periodical level of the carrier, that is, takes zero independently of the value of time t, $(A_0-B_0)\cos \omega_0(t)=0,$ and at the same time $(A_0+B_0)\cos \omega_0(t+\tau)=0.$ Because the first term and the second term must be zero at the same time independently of the value of cosine which is a function of time t, $A_0-B_0=0$, and at the same time $A_0+B_0=0 \quad (3)$ must be established.

Although $A_0$ and $B_0$ can take zero individually, there is no possibility that they take zero at the same time. This is because it is a premise in space diversity that the antennas are disposed so that $A_0$ and $B_0$ do not take zero at the same time.

That is, $A_0+B_0=0$ is not established. Therefore, the above expression (3) in not established.

Next, the case where the first term and the second term take zero independently in the expression (1) will be examined. Then, the expression (1) is transformed into the following expression (4) for the examination.

$$A_0\{\cos \omega_0(t)+\cos \omega_0(t+\tau)\}+B_0\{-\cos \omega_0(t)+\cos \omega_0(t+\tau)\}=2A_0 \cos \omega_0(t+\tau/2)\cos \omega_0(\tau/2)+2B_0\{\sin \omega_0(t+\tau/2)\sin \omega_0(\tau/2) \quad (4)$$

Then, in order to make the first term and the second term take zero at the same time independently of the values of cosine or sine which are functions of time t in the same manner as mentioned above, $$2A_0 \cos \omega_0(\tau/2)=0, \text{ and at the same time } 2B_0 \sin \omega_0(\tau/2)=0 \quad (5)$$

must be established.

Because $A_0$ or $B_0$ which are inputs of the antennas can take zero individually, there is an adequate possibility that either amplitude of the first term or the second term in the above expression (5) becomes zero. Then, when zero is taken in the term in which the amplitude is not zero, $$\cos \omega_0(\tau/2)=0, \text{ or } \sin \omega_0(\tau/2)=0 \quad (6)$$

must be established. That is, $$\omega_0(\tau/2)=(2n+1)\pi, \text{ or } \omega_0(\tau/2)=2n\pi. \quad (7)$$

To sum up, $$\omega_0\tau=n\pi, \quad (8)$$

It is understood therefrom there is a possibility that the output disappears only when the delay time $\tau$ in the delay circuit takes an integer multiple of the phase difference of 180 degrees to the carrier frequency.

However, this makes it apparent that the above expression (1) does not take zero independently of the arrangement of the antenna 1 and the antenna 2 or the state of multi-path fading if the delay time $\tau$ in the delay circuit is not set to any integer multiple of the phase difference of 180 degrees to the carrier frequency.

To sum up, in the second conventional example, the conditions for the output to disappear include the arrangement of the antenna 1 and the antenna 2 or the state of multi-path fading. It is therefore almost impossible to set the delay time of the delay circuit to a satisfactory value. Accordingly, the output has disappeared in a high frequency.

On the other hand, in the present invention, the conditions for the output to disappear are controlled by setting the delay time $\tau$ of the delay circuit to an integer multiple of the phase difference of 180 degrees to the carrier frequency. Accordingly, the disappearance of the output in the above dispute can be avoid perfectly by preventing this delay time from taking any integer multiple of the phase difference of 180 degrees to the carrier frequency.

Because the delay time of the delay circuit may be set by the unit of chip time, the chip time is basically independent of the carrier frequency. Further, the chip time is so much longer than the period of the carrier frequency that the deterioration of the accuracy to the period of the carrier, that is, the deterioration of the synchronizing accuracy influenced by the time quantity shifted from an integer multiple of the phase difference of 180 degrees is hardly generated, so that it is insignificant.

Therefore, desired setting of the delay time of the delay circuit in the present invention can be realized without any influence on others.

From the above description, in the first of the present invention, in comparison with the above-mentioned first conventional example, the receiving path of the combination circuit 13 and the following means can be made into one path, so that it is apparent that it is possible to obtain economical effects such as reducing circuit parts corresponding to one path, reducing the size of the apparatus, reducing the power consumption, reducing the cost, and so on, and in the performance, it is possible to obtain an affect to solve such a problem belonging to the above-mentioned second conventional example that a signal output frequently disappears or attenuates.

Second Embodiment

Figure 4:
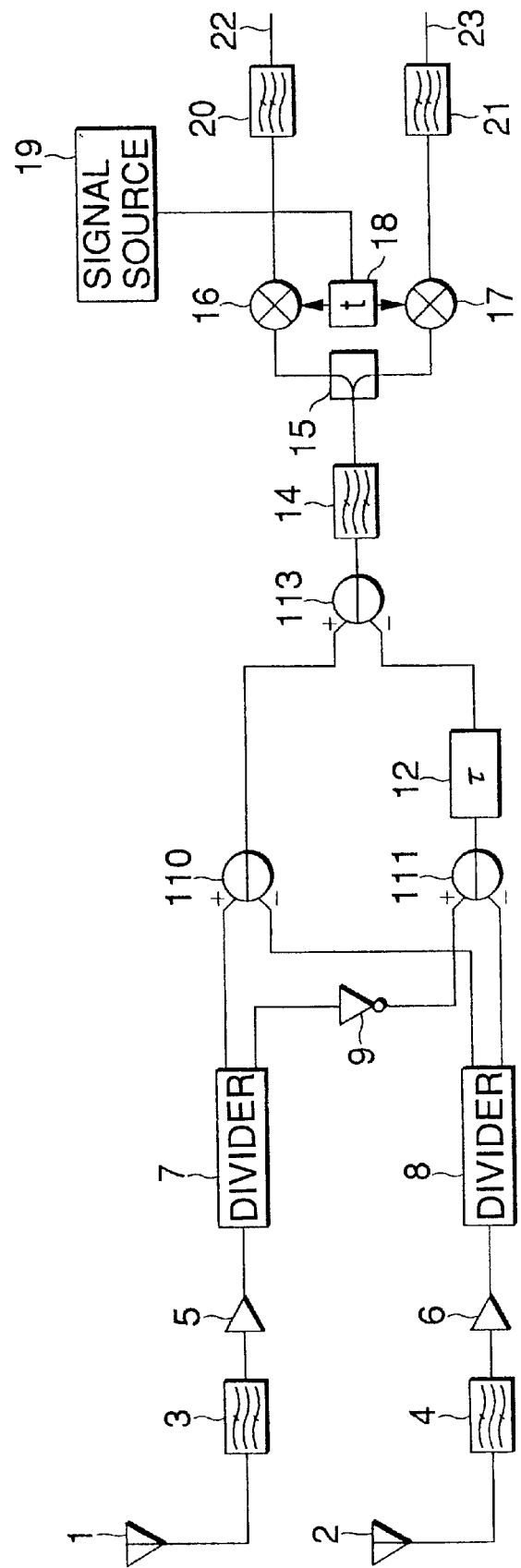
FIG. 4 is a diagram illustrating the configuration of a receiving circuit according to a second embodiment of the present invention.

FIG. 4 shows a receiving circuit according to a second embodiment of the present invention. In FIG. 4, the constituents from the reference numeral 1 to the reference numeral 23 are the same as those in the first embodiment shown in FIG. 1, except the reference numerals 110, 111 and 113.

The receiving circuit in the second embodiment of the present invention includes means 110 for subtractively combining a signal from the means 7 for dividing a desired-band signal of the branch 1 side into two paths and a signal from the means 8 for dividing a desired-band signal of the branch 2 side into two paths, means 111 for subtractively combining a signal from the means 9 for inverting polarity or shifting phase by 180 degrees and a signal from the means 8 for dividing the desired-band signal of the branch 2 side into two paths, means 12 for receiving the output of the subtractively combining means 111 and delaying the received output, and means 113 for receiving the output from the subtractively combining means 110 and the output of the delay means 12 and subtractively combining the received outputs. The output from the subtractively combining means 113 is supplied to the filter means 14 for limiting the output to a desired signal band.

The operation of the receiving circuit thus structured according to the second embodiment of the invention will be described with reference to FIG. 5.

Figure 5:
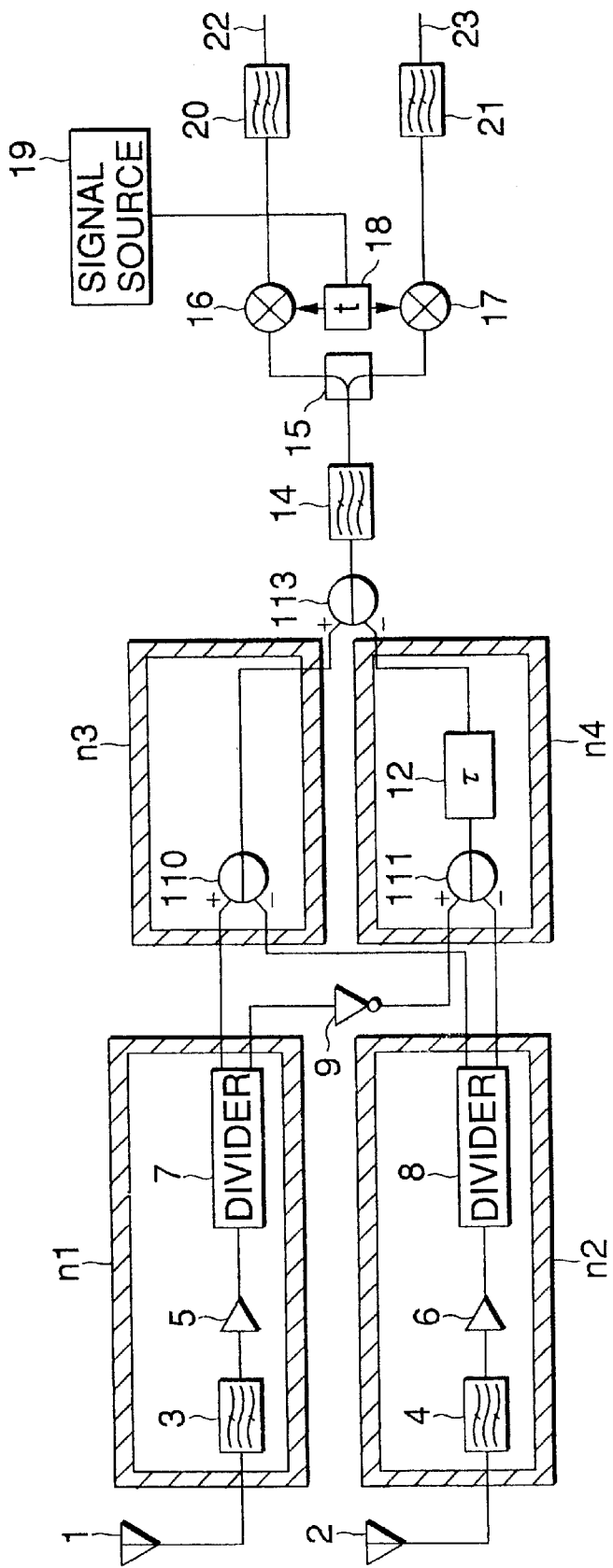
FIG. 5 is a diagram for explaining the effect in the second embodiment of the present invention.

FIG. 5 shows the state where noises mixed into the power supply or signal lines in FIG. 4. In FIG. 5, n1 designates a noise mixed into constituent parts constituted by the filter 3, the amplifier 5 and the dividing means 7 for the branch 1 of space diversity; n2 designates a noise mixed into constituent parts constituted by the filter 4, the amplifier 6 and the dividing means 8 for the branch 2 of space diversity; n3 designates a noise mixed into the combining means 110 and a signal path thereof; and n4 designates a noise mixed into the combining means 111 and a signal path thereof.

Because the noise in the output of the dividing means 7 is n1 and the noise in the output of the dividing means 8 is n2, a noise appears in the output of the subtractively combining means 110 as follows:

$$n1-n2+n3.$$

Similarly, a noise appears in the output of the subtractively coining means 111 as follows:

$$n1-n2+n4.$$

Because the polarity inverting means 9 is disposed so as to be close to an output terminal of the dividing means 7 on the circuit in FIG. 5, it is considered that the noise n1 also appears in the output terminal of the polarity inverting means 9.

Therefore, a noise appears in the output of the combining circuit 113 for receiving the output from the subtractively combining means 110 and the output from the subtractively combining means 111 as differential inputs as follows:

$$(n1-n2+n3)-(n1-n2+n4).$$

Then, if the circuits of the branch 1 and the branch 2 are under the same conditions to noises for the reason why they are equivalent geometrically or for any other reasons, $$n1=n2, \text{ and } n3=n4$$

are established.

Then, the output of the combining circuit 113 is:

$$(n1-n2+n3)-(n1-n2+n4)=(n1-n1)(-n2+n2)+(n3-n4)=0$$

That is, in the configuration according to the second embodiment of the invention, it is apparent that the noises mixed in the inside of the apparatus can be canceled so as to be reduced if the arrangements and structures of the branches are the same.

Consequently, it is possible to obtain an effect to reduce noises mixed from the neighborhood even if two paths of branch signals are passed through a single signal processing path.

Third Embodiment

Figure 6:
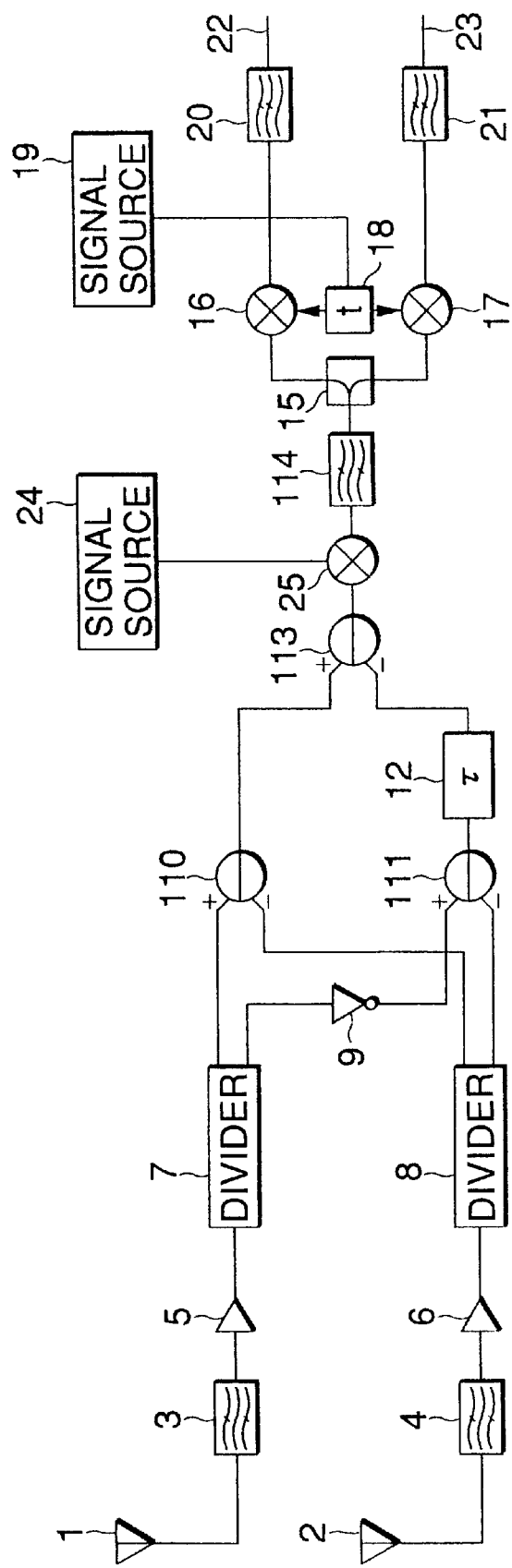
FIG. 6 is a diagram illustrating the configuration of a receiving circuit in a third embodiment of the present invention.

FIG. 6 shows a receiving circuit according to a third embodiment of the present invention. In FIG. 6, the constituents from the reference numeral 1 to the reference numeral 23 are the same as those in the second embodiment shown in FIG. 4. In the third embodiment of the present invention, an intermediate-frequency band local oscillation signal source 24, a frequency converting mixer 25 for receiving the output of the subtractively combining means 113 and the above-mentioned intermediate-frequency band local oscillation signal, and an intermediate-frequency band filter 114 are added to the configuration of the above-mentioned second embodiment.

In the above-mentioned first or second embodiment of the invention, summationally and subtractively combined and delayed signals between the branches are supplied to an orthogonal detector directly in a radio frequency band. However, in this path, the orthogonal detector and the following means must play a part as a channel filter. This is because the filters 3 and 4 close to the antennas 1 and 2 must pass all the frequency channels, and, therefore, they cannot be made to be a filter only for passing a desired frequency channel.

That is, all the circuit to the orthogonal detector is required to have a broad-band performance to pass all the channels, the local oscillation signal source 19 to the orthogonal detector must be switched in accordance with a desired channel frequency, and the filters 20, 21 and so on following the detector are required to have a function to eliminate adjacent waves in a wide range.

In addition, because the rate of generation of saturated state in the circuit dynamic range is increased due to the adjacent waves and so on, so-called signal suppression appears on signals in the desired channel.

In the third embodiment of the invention, a channel filter function is held by providing an intermediate-frequency converting means constituted by the intermediate-frequency band local oscillation signal source 24, the frequency converting mixer 25, and the intermediate-frequency band filter 114, so that the disadvantage to require the following circuits such as the orthogonal detector and so on to have a channel filter function is eliminated. By switching the frequency of the intermediate-frequency band local oscillation signal source 24, a desired channel signal is easily tuned in the intermediate-frequency band, so that it is possible to establish a channel filter function by the intermediate-frequency band filter 114 having only single-channel width.

As a result, the following circuits, for example, circuits for the orthogonal detector may have only a narrow band performance to pass a single channel. Accordingly, the local oscillation signal source 19 for the detector and the following means can be made to have a fixed frequency, and the filters 20, 21 and so on following the detector may have only a narrow-range pass band. In addition, the generation of saturated state in the circuit dynamic range caused by desired waves and so on is reduced, so that it is possible to obtain an effect to reduce signal suppression on signals of a desired channel.

Forth Embodiment

Figure 7:
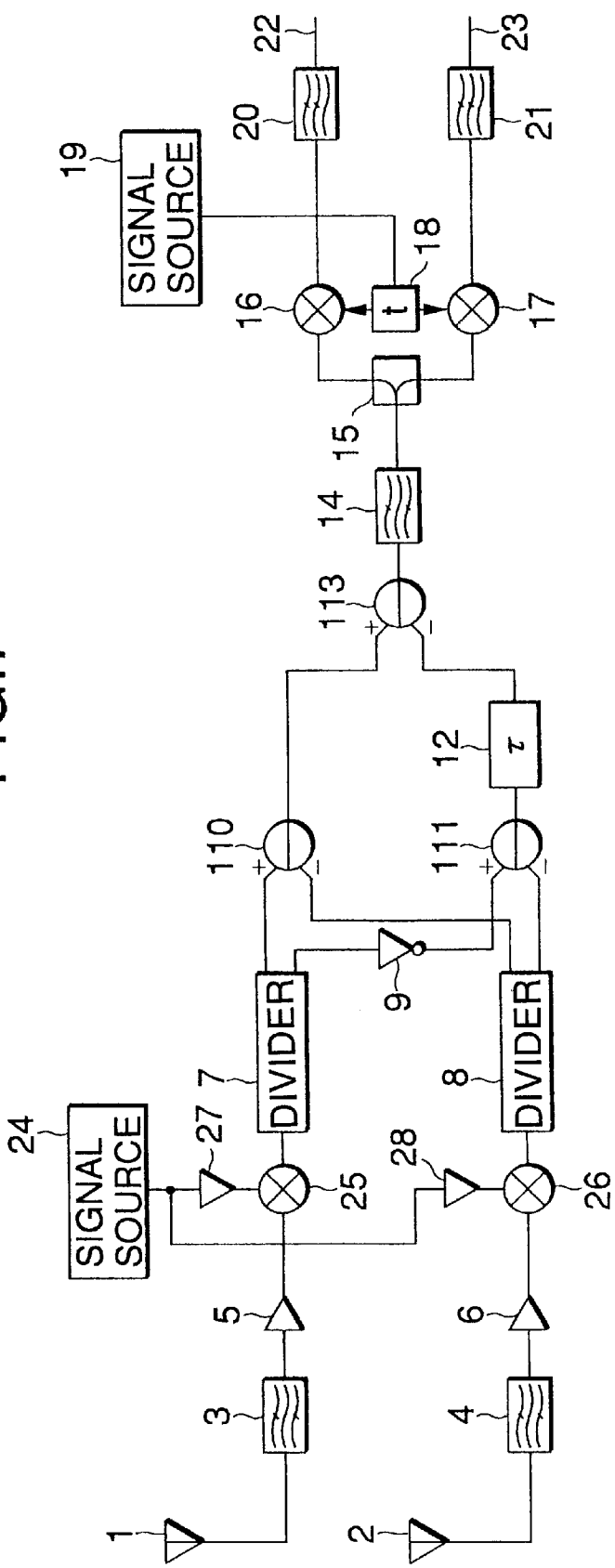
FIG. 7 is a diagram illustrating the configuration of a receiving circuit in a fourth embodiment of the present invention.

FIG. 7 shows the configuration of a receiving circuit in a fourth embodiment of the present invention. In FIG. 7, the constituents of the reference numerals from 1 to 23 are the same as those in the second embodiment shown in FIG. 4.

In the fourth embodiment of the present invention, an intermediate-frequency band local oscillation signal source 24, a frequency converting mixer 25 for receiving the output of the amplifier 5 and the above-mentioned intermediate-frequency band local oscillation signal, a frequency converting mixer 26 for receiving the output of the amplifier 6 and the above-mentioned intermediate-frequency band local oscillation signal, an amplifier 27 for receiving the above-mentioned intermediate-frequency band local oscillation signal and supplying its output to the frequency converting mixer 25, and an amplifier 28 for receiving the above-mentioned intermediate-frequency band local oscillation signal and supplying its output to the frequency converting mixer 26 are added to the configuration of the above-mentioned second embodiment of the invention.

In the first, second or third embodiment of the invention, the frequency band to generate a sum and a difference of respective branch signals is in a radio frequency band. Therefore, when the radio frequency is, for example, 1 GHz, the difference of circuit wiring length between the branches has to be set to 1.67 mm or less in order to make the phase difference between the branches 3 degrees or less. That is, the degree of freedom in designing circuit wiring decreases extremely. At the same time, a severe restriction becomes required in the change of performance of parts due to a temperature change or the like.

In order to solve such a problem with the first to third embodiments, the fourth embodiment of the present invention is designed so that sum and difference signals are obtained after lowering the respective branch signals to an intermediate-frequency band.

In FIG. 7, the output of the amplifier 5 for amplifying the received signal of the branch 1 is supplied to the frequency converting mixer 25, and converted into an intermediate frequency. The output of the amplifier 6 for amplifying the received signal of the branch 2 is supplied to the frequency converting mixer 26, and converted into the intermediate frequency. The frequency converting mixers 25 and 26 receive an intermediate-frequency band local oscillation signal from the intermediate-frequency band local oscillation signal source 24 through the amplifiers 27 and 28 respectively. A desired channel can be selected by changing-over the intermediate-frequency band local oscillation frequency from the intermediate-frequency band local oscillation signal source 24.

The output of the frequency converting mixer 25 is supplied to the means 7 for dividing the output into two paths, while the output of the frequency converting mixer 26 in supplied to the means 8 for dividing the output into two paths. The succeeding operation is the same as that in the above-mentioned second embodiment. Although all the means from the dividing means 7 and 8 to the multipliers 16 and 17 of the orthogonal detector are in the radio frequency band in the second embodiment of the invention, however, they are in a intermediate-frequency band in the fourth embodiment of the invention.

As a result, the phase accuracy depending on the length of wiring of the circuits for generating sum and difference signals and the circuits for polarity inversion or signal delay may be defined in accordance with the intermediate frequency.

On the assumption that the intermediate frequency is 100 MHz, it will go well if the circuit wiring length is set to 16.7 mm or less in order to make the phase difference between sum and difference signals be not larger than 3 degrees. Accordingly, the degree of freedom in designing the circuit wiring has a tolerance ten times an large as that in the case of the radio frequency band. In addition, because all the means from the dividing means 7 and 8 to the multipliers 16 and 17 of the orthogonal detector may be in the intermediate-frequency band, there is another effect that semiconductor devices are designed easily and the power consumption can be reduced on a large scale.

Fifth Embodiment

Figure 8:
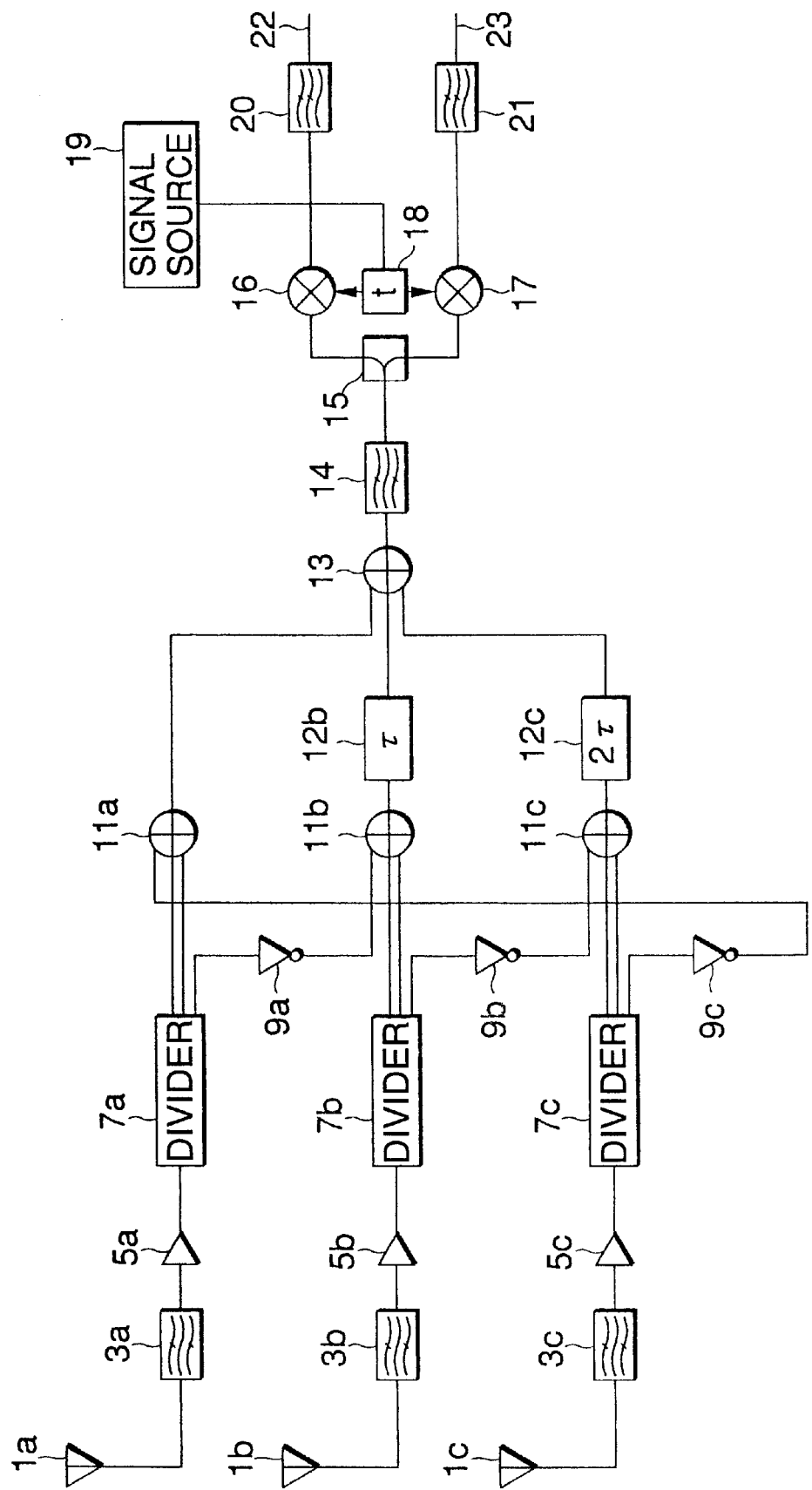
FIG. 8 is a diagram illustrating the configuration of a receiving circuit in a fifth embodiment of the present invention.
Figure 9:
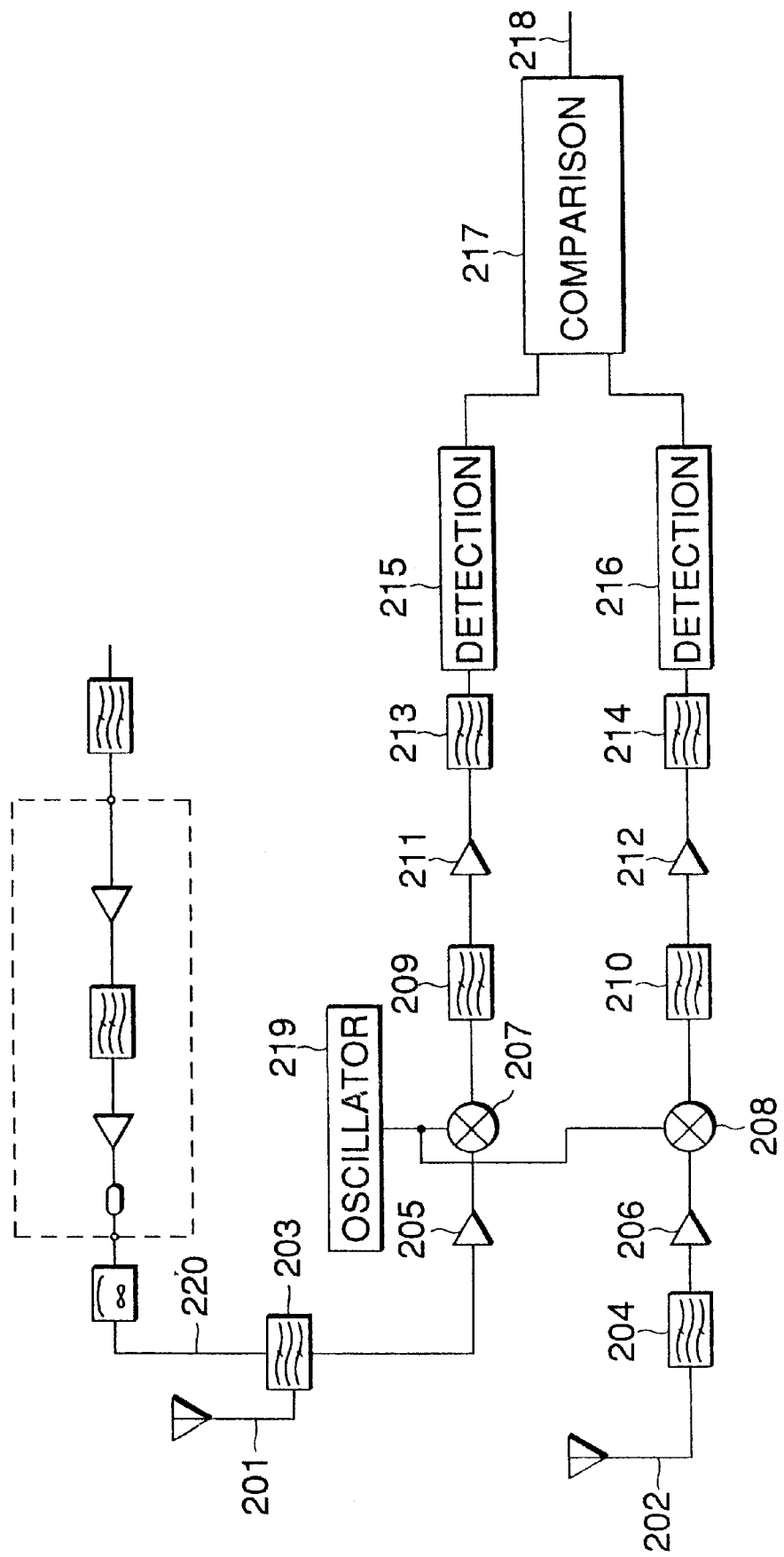
FIG. 9 is a diagram illustrating the configuration of a first conventional receiving circuit having two receiving paths.
Figure 10:
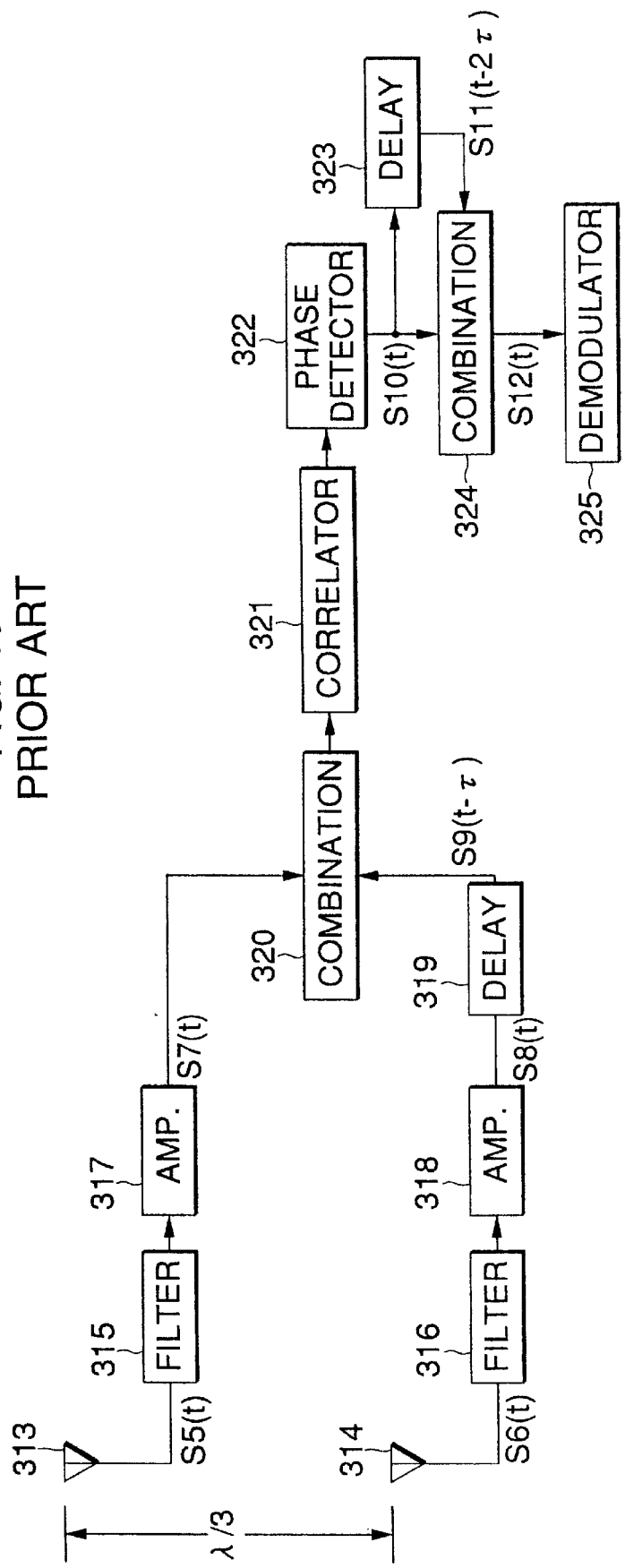
FIG. 10 is a diagram illustrating the configuration of a second conventional receiving circuit in which the receiving paths are reduced.

FIG. 8 shows the configuration of a receiving circuit in a fifth embodiment of the present invention. In FIG. 8, the constituents from the reference numeral 13 to the reference numeral 23 are the same an those in the first embodiment shown in FIG. 1. In addition, the constituents from the reference numeral 1 to the reference numeral 12 are also the same as those in the first embodiment of the invention except for the suffixed provided In the receiving circuit.

In the fifth embodiment of the present invention, the constituents of the reference numerals from 1 to 12 in the first embodiment of the invention are designed so as to have a plurality of constituent parts. That is, there are provided antennas 1a, 1b and 1c for respective branches of space diversity, filters 3a, 3b and 3c for receiving arriving wave signals obtained by the antennas 1a, 1b and 1c and extracting a signal component in a desired band, amplifiers 5a, 5b and 5c for amplifying the desired-band signals obtained by the filters 3a, 3b and 3c, means 7a, 7b and 7c for dividing the desired-band signals from the respective branches into three paths, means 9a, 9b and 9c for inverting polarity or shifting phase by 180 degrees, means 11a, 11b and 11c for combining a signal obtained from one of the dividing means 7a, 7b and 7c and signals obtained from two of the polarity inverting or 180-degrees phase shifting means 9a, 9b and 9c, meant 12b for receiving the output of the combining means 11b and delaying the received output by $\tau$, and means 12c for receiving the output of the combining means 11c and delaying the received output by $2\tau$.

The operation of the receiving circuit in the fifth embodiment of the invention thus configured will be described with reference to FIG. 8.

When a signal of the branch 1 is designated by A1, a signal of the branch 2 is by A2, and a signal of the branch 3 is by A3, the outputs of the combining circuits 11a, 11b and 11c are respectively expressed by:

(output of the combining circuit 11a)=$A1+A2-A3$ (output of the combining circuit 11b)=$-A1+A2+A3$ (output of the combining circuit 11c)=$A1-A2+A3$.

When a signal delayed by the delay circuit 12b is expressed by adding a suffix ($\tau 1$), and a signal delayed by the delay circuit 12c is expressed by adding a suffix ($\tau 2$), the output of the combining circuit 13 is expressed by the following expressions (9) and (10).

(output of the combining circuit)=$A1+A2-A3-A1(\tau 1)+A2(\tau 1)$ $+A3(\tau 1)+A1(\tau 2)-A2(\tau 2)+A3(\tau 2)$ \hfill (9)

$=\{A1-A1(\tau 1)+A1(\tau 2)\}+\{A2++A2(\tau 1)-$ $A2(\tau 2)\}+\{A3+A3(\tau 1)+A3(\tau 2)\}$ \hfill (10)

The expression (9) means that only one in any of groups in which the delay quantity is made the same in the combination of the respective branches is inverted in its polarity, that is, is shifted in its phase by 180 degrees, and a branch different by group is inverted in its polarity, that is, is shifted in its phase by 180 degrees.

This means that the signals of the branches 1, 2 and 3 are prevented from disappearance arising when they are combined into a single signal.

The expression (10) means that in the case where signals in the same branch are subjected to a plurality of delays and then combined so that the signals disappear, it can be prevented that all the signals of the branch disappear if combination of addition and subtraction differently by branch is carried out.

This will be made clearer by use of numerical expressions.

Similarly to the case of two branches, it will be examined whether the output disappear or not under peculiar conditions in the fifth embodiment of the invention.

That is, when the sum-difference delay combination takes zero, the above-mentioned expression (10) can be expressed by the following expression (11) on the assumption that the carrier frequency is expressed by $\omega_0$.

$\{A1-A1(\tau 1)+A1(\tau 2)\}+\{A2+A2(\tau 1)-A2(\tau 2)\}+\{-$ $A3+A3(\tau 1)+A3(\tau 2)\}$ $=A_{01}\{\cos \omega_0(t)-$ $\cos \omega_0(t+\tau)+\cos \omega_0(t+2\tau)\}+A_{02}\{\cos \omega_0(t)+\cos \omega_0(t+\tau)-$ $\cos \omega_0(t+2\tau)\}+A_{03}\{-\cos \omega_0(t)+\cos \omega_0(t+\tau)+\cos \omega_0(t+2\tau)\}=0$ \hfill (11)

wherein $A_{01} \geq 0$, $A_{02} \geq 0$, $A_{03} \geq 0$

In order to make the value of this expression take zero, the first, second and third terms must cancel each other, or take zero at the same time, so long as $A_{01}$, $A_{02}$ and $A_{03}$ are not zero.

First, in order to confirm whether the first, second and third terms cancel each other or not, the expression (10) can be expressed by the following expression (12) obtained by combining like terms.

$\{A1-A1(\tau 1)+A1(\tau 2)\}+\{A2+A2(\tau 1)-A2(\tau 2)\}+\{-$ $A3+A3(\tau 1)+A3(\tau 2)\}$ $=(A_{01}+A_{02}-A_{03})\cos \omega_0(t)+(-A_{01}+A_{02}+A_{03})\cos \omega_0(t+\tau)$ $+(A_{01}-A_{02}+A_{03})\cos \omega_0(t+2\tau)=0$ \hfill (12)

In order to make the value of this expression (12) take zero in the periodical level of the carrier, that is, takes zero independently of the value of time t, $$(A_{01}+A_{02}-A_{03})\cos \omega_0(t)=0,$$

at the same time, $$(-A_{01}+A_{02}+A_{03})\cos \omega_0(t+\tau)=0, \text{ and}$$

at the same time, $$(A_{01}-A_{02}+A_{03})\cos \omega_0(t+2\tau)=0$$

must be established.

Because the first, second and third terms must take zero at the same time independently of the value of cosine which is a function of time t, $$A_{01}+A_{02}-A_{03}=0,$$

at the came time, $$-A_{01}+A_{02}+A_{03}=0, \text{ and}$$

at the same time, $$A_{01}-A_{02}+A_{03}=0 \tag{13}$$

must be established.

The necessary condition for establishing the expression (13) is:

$$A_{01}+A_{02}+A_{03}=0.$$

Although $A_{01}$, $A_{02}$ and $A_{03}$ can take zero individually because they are absolute values, there is no possibility that they take zero at the same time. This is because it is a premise in space diversity that the antennas are arranged so that the values do not take zero at the same time. Therefore, $A_{01}+A_{02}+A_{03}=0$ is established.

Next, the case where the first, second and third terms take zero independently in the expression (11) will be examined. Then, the expression (11) is transformed into the following expression (14) for the examination.

$A_{01}\{\cos \omega_0(t)-$ $\cos \omega_0(t+\tau)+\cos \omega_0(t+2\tau)\}+A_{02}\{\cos \omega_0(t)+\cos \omega_0(t+\tau)-$ $\cos \omega_0(t+2\tau)\}+A_{03}\{-\cos \omega_0(t)+\cos \omega_0(t+\tau)+\cos \omega_0(t+2\tau)\}$ $=A_{01}(\cos \omega_0(t+\tau)\cos \omega_0(\tau/2)+\frac{1}{2}\{\sin \omega_0(t+\tau/2)+\sin \omega_0(t+3\tau/2)\}$ $\sin 107_0(\tau/2))+A_{02}(\cos \omega_0(t+\tau/2)\cos \omega_0(\tau/2)+\frac{1}{2}\{\sin \omega_0(t+\tau)$ $+\sin \omega_0(t+3\tau/2)\}\sin \omega_0(\tau/2))+A_{03}(\cos \omega_0(t+3\tau/2)\cos \omega_0(\tau/2)$ $+\frac{1}{2}\{\sin \omega_0(t+\tau/2)+\sin \omega_0(t+\tau)\}\sin \omega_0(\tau/2))$ $=A_{01}\{\cos \omega_0(t+\tau)\cos \omega_0(\tau/2)+\sin \omega_0(t+\tau)\sin \omega_0(\tau/2)\cos \omega_0(\tau+2)\}$ $+A_{02}\{\cos \omega_0(t+\tau/2)\cos \omega_0(\tau/2)+\sin \omega_0(t+5\tau/4)\sin \omega_0(\tau/2)\cos \omega_0(\tau/2)\}$ $+A_{03}\{\cos \omega_0(t+3\tau/2)\cos \omega_0(\tau/2)+\sin \omega_0(t+3\tau/4)\sin \omega_0(\tau/2)\cos \omega_0(\tau/2)\}$ $=\cos \omega_0(\tau/2)(A_{01}\{\cos \omega_0(t+\tau)+\sin \omega_0(t+\tau)\sin \omega_0(\tau/2)\}$ $+A_{02}\{\cos \omega_0(t+\tau/2)+\sin \omega_0(t+5\tau/4)\sin \omega_0(\tau/2)\}$ $+A_{03}\{\cos \omega_0(t+3\tau/2)+\sin \omega_0(t+3\tau/4)\sin \omega_0(\tau/2)\} \tag{14}$ In order to mike the values of the first to third terms of the above-mentioned expression (14) take zero at the same time independently of the values of cosine or sine which are functions of time t, $$\cos \omega_0(\tau/2)=0 \tag{15}$$

$$\tau/2=(2n+1)\pi.$$

That is, $$\tau=n\pi. \tag{16}$$

It is apparent that the output may disappear only when the delay time τ in the delay circuit takes an integer multiple of the phase difference of 180 degrees to the carrier frequency.

However, this makes it apparent that the above expression (14), that is,, the above expression (11) does not take zero independently of the arrangement of the antenna 1, the antenna 2 and the antenna 3 or the state of multi-path fading unless the delay time τ in the delay circuit is set to any integer multiple of the phase difference of 180 degrees to the carrier frequency.

As is apparent from the above description, it can be the that the receiving circuit in the fifth embodiment of the present invention performs the same operation as the receiving circuit In the above-mentioned first embodiment of the invention basically. Therefore, it is apparent that the space diversity effect of the present invention can be exhibited in the configuration of the fifth embodiment of the invention also in the case where three or more antennas or branches are provided.

In the receiving circuit in the fifth embodiment of the present invention, in comparison with the above-mentioned first embodiment of the invention, the receiving path of the combining circuit 13 and the following means can be made into one path in spite of increasing the number of branches in order to improve the space diversity effect. As a result, as the space diversity effect is more improved, the receiving circuit in the fifth embodiment of the invention can be expected to have a effect higher than the receiving circuit in the first embodiment of the invention.

Although the configuration and operation of the receiving circuit in the fifth embodiment of the invention have been described on the basis of the receiving circuit in the first embodiment of the invention, the configuration and operation can be described in quite the same manner even if they are described on the basis of the receiving circuit in the second embodiment of the invention.

As is apparent from the above description, according to the present invention, the receiving circuit comprises means for generating a sum signal or a difference signal from signals of two paths received by the respective antennas, means for giving delay to either an output of the sum signal generating means or an output of the difference signal generating means, means for summationally combining an output of the delay means and the signal of the not-delayed path, a desired-wave pass filter means for receiving an output of the summationally combining means, a dividing means for receiving an output of the desired-wave pass filter means, an orthogonal detection means for receiving an output of the dividing means, and a filter means for receiving an output of the orthogonal detection means to extract a base band signal therefrom, wherein the receiving path including the summationally combining means and the following are made into one path. Accordingly, not only a space diversity function similar to that of the first conventional example having two receiving paths independently can be realized, but also the size and the power consumption can be reduced.

What is claimed is:

1. A space diversity radio frequency receiving circuit, comprising:

a first signal receiving branch having an antenna and a divider for dividing the first branch into a first path and a second path, the second path having the capability of being shifted in phase;

a second signal receiving branch having an antenna and a divider for dividing the second branch into a first path and a second path;

a pair of combining means for generating a sum signal or a difference signal from signals of the first branch first path and the second branch first path, and the first branch second path and the second branch second path respectively;

means for giving delay to an output of one of said combining means;

means for summationally combining an output of said delay means and an output of the not-delayed combining means so that the first signal receiving branch and the second signal receiving branch are made into one combined signal;

desired-wave pass filter means for receiving an output of said summationally combining means;

dividing means for receiving an output of said desired-wave pass filter means;

orthogonal detection means for receiving an output of said dividing means; and filter means for receiving an output of said orthogonal detection means to extract a base band signal therefrom.

2. A receiving circuit according to claim 1, wherein means for subtractively combining the output of said delay means and the output of the not-delayed combining means is provided in place of said means for summationally combining the output of said delay means and the output of the not-delayed combining means.

3. A receiving circuit according to claim 1, further comprising intermediate-frequency converting means constituted by an intermediate-frequency local oscillation signal source, a frequency conversion mixer and an intermediate-frequency band filter, wherein the output of said means for summationally combining the output of said delay means and the output of the not-delayed combining means is applied to said intermediate frequency converting means.

4. A receiving circuit according to claim 1, wherein individual frequency converting means are provided for each of said signal receiving branches, and said means for generating a sum signal or a difference signal from the signals of said two signal receiving branches obtained by said respective frequency converting means are provided in an intermediate-frequency band.

5. A receiving circuit according to claim 1, further comprising a third signal receiving branch having an antenna and a divider for dividing the third branch into a first path, a second path and a third path, the dividers of the first and second branches dividing the first and second branches into respective third paths, and a third combining means for generating a sum signal or a difference signal upon signals from the respective paths of the three branches, a second means for giving delay to an output of the third combining means, and said means for summationally combining also combining an output of the second delay means.

6. A receiving circuit according to claim 2, further comprising intermediate-frequency converting means constituted by an intermediate-frequency local oscillation signal source, a frequency conversion mixer and an intermediate-frequency band filter, wherein the output of said means for subtractively combining the output of said delay means and the output of the not-delayed combining means is applied to said intermediate frequency converting means.

* * * * *

UNITED STATES PATENT AND TRADEMARK OFFICE
CERTIFICATE OF CORRECTION

PATENT NO. : 6,044,254
DATED : March 28, 2000
INVENTOR(S) : Ohta et al.

It is certified that error appears in the above-identified patent and that said Letters Patent is hereby corrected as shown below:

Title page,
Title, delete "RECEIVING CIRCUIT" and insert --SPACE DIVERSITY RADIO FREQUENCY RECEIVING CIRCUIT--.(Title was amended in the amendment filed on 10/29/1999).

Title Page, References Cited, FOREIGN DOCUMENTS, insert
--Hei 7-87057—Japan--.

Column 1, Line 1, Title, delete "RECEIVING CIRCUIT' and insert
--SPACE DIVERSITY RADIO FREQUENCY RECEIVING CIRCUIT--. (Title was amended in the amendment filed on 10/29/1999).

Column 2,
Line 39, delete "frog" and insert --from--.

Column 3,
Line 25, delete "net" and insert --set--.
Line 28, delete "in" and insert --is--.
Line 45, delete "in" and insert --is--.
Line 50, delete "in" and insert --is--.

Column 6,
Line 38, delete "in" and insert --is--.

Column 8,
Line 27, delete "in" and insert --is--.
Line 47, delete "t" and insert --$\underline{t}$--.
Line 57, delete "t" and insert --$\underline{t}$--.

UNITED STATES PATENT AND TRADEMARK OFFICE
CERTIFICATE OF CORRECTION

PATENT NO.   : 6,044,254
DATED        : March 28, 2000
INVENTOR(S)  : Ohta et al.

It is certified that error appears in the above-identified patent and that said Letters Patent is hereby corrected as shown below:

Column 9,
Line 10, delete "t" and insert --$\underline{t}$--.

Column 13,
Line 6, delete "in" and insert --is--.
Line 40, delete "In" and insert --in--.

Column 15,
Line 3, delete "t" and insert --$\underline{t}$--.
Line 50, delete "107" and insert --ω--.

Column 16,
Line 2, delete "t" and insert --$\underline{t}$--.
Line 25, delete "In" and insert --in--.

Signed and Sealed this

Nineteenth Day of June, 2001

*Attest:*

*Nicholas P. Godici*

NICHOLAS P. GODICI
*Attesting Officer*          *Acting Director of the United States Patent and Trademark Office*